United States Patent [19]

McDevitt et al.

[11] Patent Number: 5,204,130
[45] Date of Patent: Apr. 20, 1993

[54] RECLOSABLE CONTAINER FOR SLICED FOOD PRODUCTS

[75] Inventors: John F. McDevitt, Evanston; David J. Johnson, Beach Park; Denis H. Nelson, Wheaton, all of Ill.

[73] Assignee: Kraft General Foods, Inc., Northfield, Ill.

[21] Appl. No.: 728,708

[22] Filed: Jul. 11, 1991

[51] Int. Cl.⁵ .................. B65D 43/00; B65D 85/00
[52] U.S. Cl. ...................... 426/115; 206/815; 220/339; 426/129; 426/130
[58] Field of Search .............. 426/106, 115, 129, 130; 206/815; 220/339

[56] References Cited

U.S. PATENT DOCUMENTS

| | | | |
|---|---|---|---|
| 2,185,604 | 1/1940 | Moore | 229/43 |
| 2,873,782 | 2/1959 | Gunn | 150/48 |
| 2,935,188 | 5/1960 | Thomas | 206/42 |
| 3,407,079 | 10/1968 | Griffith et al. | 426/119 |
| 3,410,698 | 11/1968 | Sosin | 99/174 |
| 3,419,184 | 12/1968 | Asenbauer | 220/97 |
| 3,434,625 | 3/1969 | Embry, Jr. | 220/65 |
| 3,710,975 | 1/1973 | Jansen | 220/31 |
| 3,759,416 | 9/1973 | Constantine | 220/97 F |
| 3,893,566 | 7/1975 | Ross | 206/498 |
| 3,904,074 | 9/1975 | Hoffman et al. | 220/339 |
| 3,955,006 | 5/1976 | Sokolsky et al. | 426/392 |
| 4,046,923 | 9/1977 | Meng et al. | 426/130 |
| 4,098,430 | 7/1978 | Mattheis et al. | 220/339 |
| 4,202,464 | 5/1980 | Mohs et al. | 220/339 |
| 4,226,358 | 10/1980 | Ottow | 229/44 R |
| 4,243,140 | 1/1981 | Thrun | 206/380 |
| 4,241,863 | 12/1980 | Faller | 229/27 |
| 4,358,025 | 11/1982 | Urion | 220/258 |
| 4,401,229 | 8/1983 | Bell et al. | 220/259 |
| 4,498,588 | 2/1985 | Scott | 206/526 |
| 4,498,589 | 2/1985 | Scott et al. | 206/526 |
| 4,553,692 | 11/1985 | Padovani | 229/2.5 EC |
| 4,579,246 | 4/1986 | Swearingen et al. | 220/258 |
| 4,583,679 | 4/1986 | Johnson | 229/43 |
| 4,648,511 | 3/1987 | Ritman | 206/541 |
| 4,756,425 | 7/1988 | Wise | 206/596 |
| 4,768,703 | 9/1988 | Sosler et al. | 229/123.1 |
| 4,811,846 | 3/1989 | Bottega | 206/542 |
| 4,848,580 | 7/1989 | Wise | 206/519 |
| 4,966,283 | 10/1990 | Sykes et al. | 206/387 |
| 4,971,220 | 11/1990 | Kaufman et al. | 220/335 |
| 5,012,928 | 5/1991 | Proffitt et al. | 206/508 |
| 5,036,997 | 8/1991 | May et al. | 220/335 |

Primary Examiner—George Yeung
Attorney, Agent, or Firm—Fitch, Even, Tabin & Flannery

[57] ABSTRACT

A reclosable container for sliced food products having a one-piece container body and integral hinge and lid. The front wall of the container body is provided with a forward protrusion to facilitate removal of a desired number of slices. A locking mechanism enables the lid to be locked in closed position, and provides an audible indication when the lid is locked. The container is reusable and may be made from a polymeric material having sufficient transparency to enable the consumer to count slices viewed through the front wall as they are being removed.

8 Claims, 3 Drawing Sheets

RECLOSABLE CONTAINER FOR SLICED FOOD PRODUCTS

The invention is directed to an improved reclosable container for sliced food products, and more particularly to a food container which provides a means for facilitating the separation and removal of sliced food products from such a container.

BACKGROUND OF THE INVENTION

Reclosable containers are used to protect sliced food products from mechanical damage during shipping and to retard desiccation and spoilage. Such containers have been commonly used with sliced cheese products. Reclosable containers have been used with slices which are either individually wrapped or left unwrapped before being stacked and inserted into the container. The slices are typically oriented horizontally, i.e., with each slice in a horizontal plane. During shipping, the sliced food products often become compressed together. As a result, both individually wrapped and unwrapped slices are often difficult to separate from one another prior to their removal from the container. In order to separate the food slices, a consumer or food preparer may have to excessively handle the slices. Such handling is generally undesirable and inconvenient, especially with unwrapped slices.

The prior art includes disposable box-like containers with an integral hinged lid attached to the back wall, made from a thin layer of a semi-rigid plastic material. In one particular prior art container, the back wall of the container has two vertical flutes which are spaced from one another and which provide a degree of access to the rear edges of the slices. However, if the container is held in one hand with the front wall facing the user, and the consumer uses his or her other hand to open the lid and remove the slices, the consumer has no visual contact with the rear edges of the slices which are being engaged. Therefore, the consumer cannot easily count the number of slices before removing them from the container. Moreover, the mechanics of inserting two fingers at the rear of the container can be awkward, particularly because the hinge of the container tends to urge the lid toward the closed position.

In another particular prior art container, vertical flutes are formed in each of the walls. However, in this prior art container, as well as in the previously described prior art container, the flutes are not large enough to provide convenient access to the edges of the slices.

Some existing disposable sliced food containers are difficult to reclose properly. Such containers are typically formed from a relatively thin layer of a polyester or other polymeric material having a thickness of about 0.01 in. When the consumer applies pressure to the lid of one of these disposable containers to open or close it, the container tends to deform, and may not open or close properly. Another problem with the prior disposable containers is that they increase the volume of package material which must be disposed of or recycled when the product has been used.

One object of the invention is to provide a reclosable container from which stacked, sliced food products may be easily removed without excessive handling.

Another object of the present invention is to provide a reclosable container from which a desired number of food products may be easily removed.

A further object of the invention is to provide a container which is easily and repeatably closed.

Further objects and advantages of the invention are described below and shown in the accompanying drawings.

SUMMARY OF THE INVENTION

The invention comprises an improved reclosable container for confining and protecting sliced food products from mechanical damage and contamination, which provides improved access to sliced food products to facilitate separation and removal of slices. The container has a locking mechanism which is relatively easy to operate and which provides audible indications of locking and unlocking. The invention also comprises a packaging system wherein a plurality of such containers may be stacked for shipping and/or display.

The container comprises a one-piece container body defining a container cavity. The container cavity is defined by a base wall, two sidewalls, a back wall, and a front wall having a forward protrusion. The four walls extend upward from the base wall and end in a resilient lip. The back wall of the container body is joined to a lid at the lip by an integral hinge. The containers may be formed from a suitable polymeric material such as polypropylene, with walls averaging at least about 0.025 in. thick, and preferably about 0.05 to about 0.1 in. thick. The containers will accept sliced food products which have been packaged in conventional plastic wrap. After the plastic wrap is opened, the food product may be placed in the reusable, reclosable container to protect the product and to prevent or retard desiccation.

In the most preferred embodiment of the invention, the lid is provided with a downwardly projecting rim having an outwardly projecting opening tab, and the locking mechanism includes a rib projecting inwardly from the rim which engages a projection on the bottom of the lip of the container body. When the consumer closes the lid, the rib engages the projection and depresses the lip, then permits the lip to snap outward with the projection in locking engagement with the lid. To limit inward deflection of the lip and ensure that secure locking engagement and audible snap are provided, the lid has a pair of tabs or teeth extending downward therefrom to engage the inner edge of the lip.

The lid may also be provided with a raised peripheral ridge defining a central depression. The lid depression is slightly larger than the base wall and of similar shape. Thus, when the containers are stacked, the base wall of a first container can be confined within the lid depression of a second container by the peripheral ridge of the second container.

DETAILED DESCRIPTION OF THE PREFERRED EMBODIMENT

Figure 1:
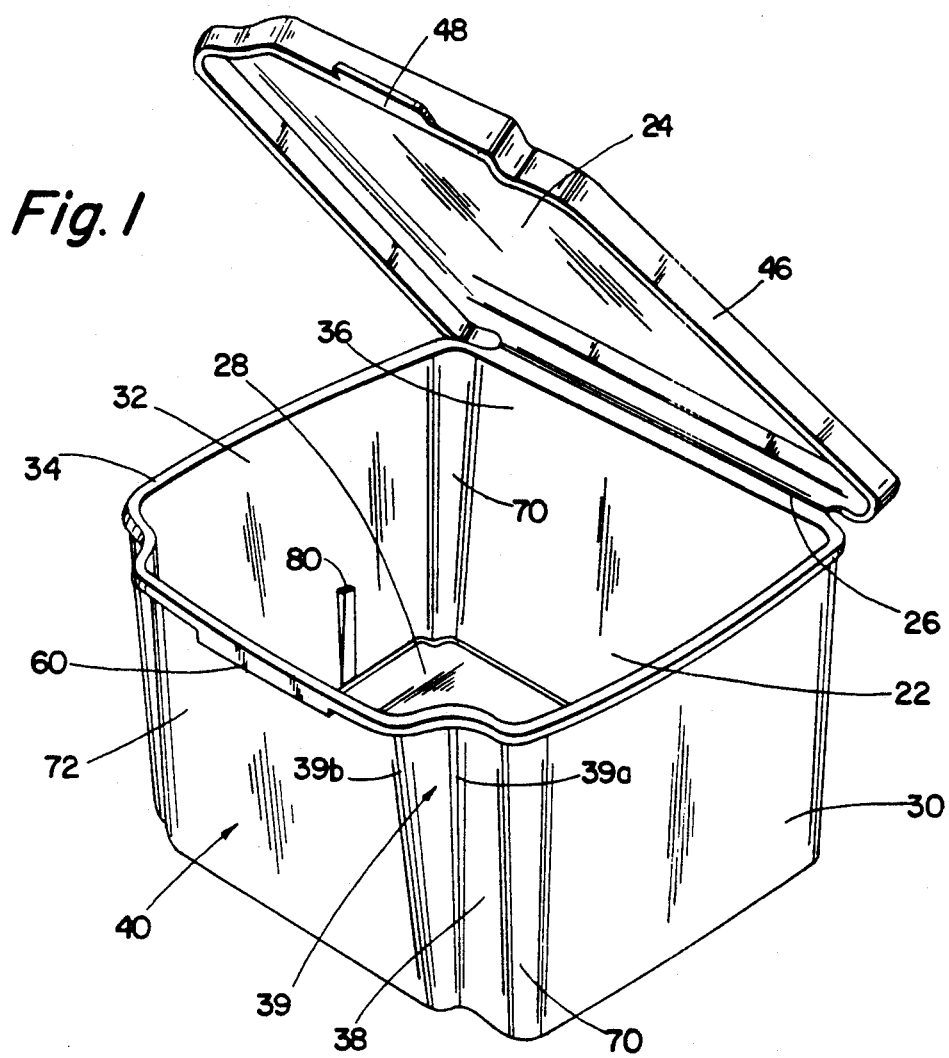
FIG. 1 is a perspective view of the container in accordance with the invention with the lid open.
Figure 2:
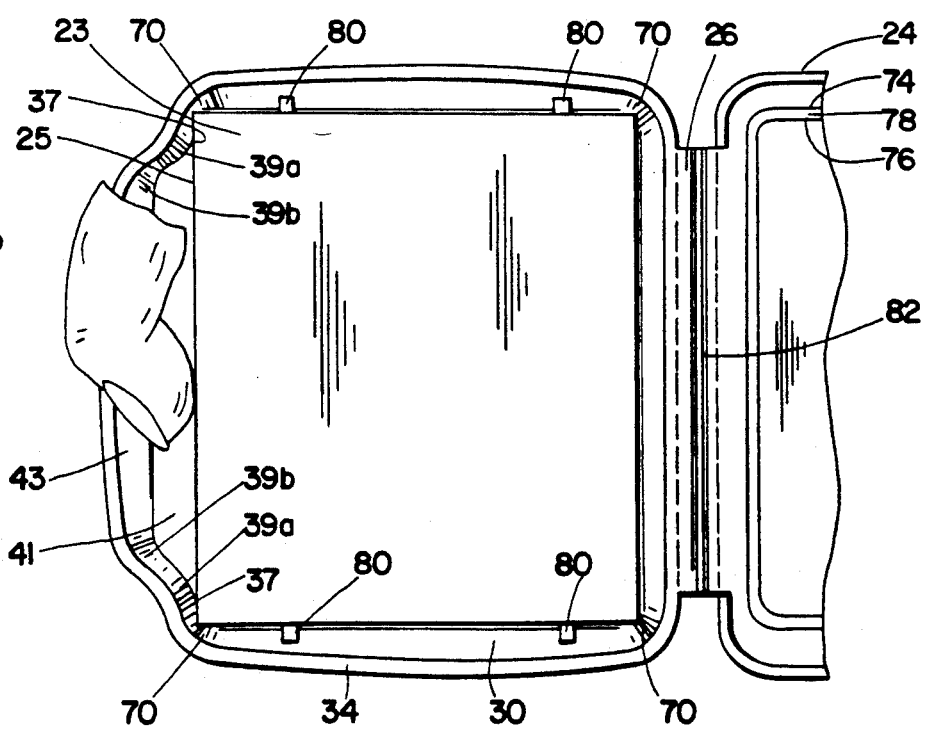
FIG. 2 is a top plan view of the container filled with a stack of sliced food product and with the lid open and partially broken away.
Figure 3:
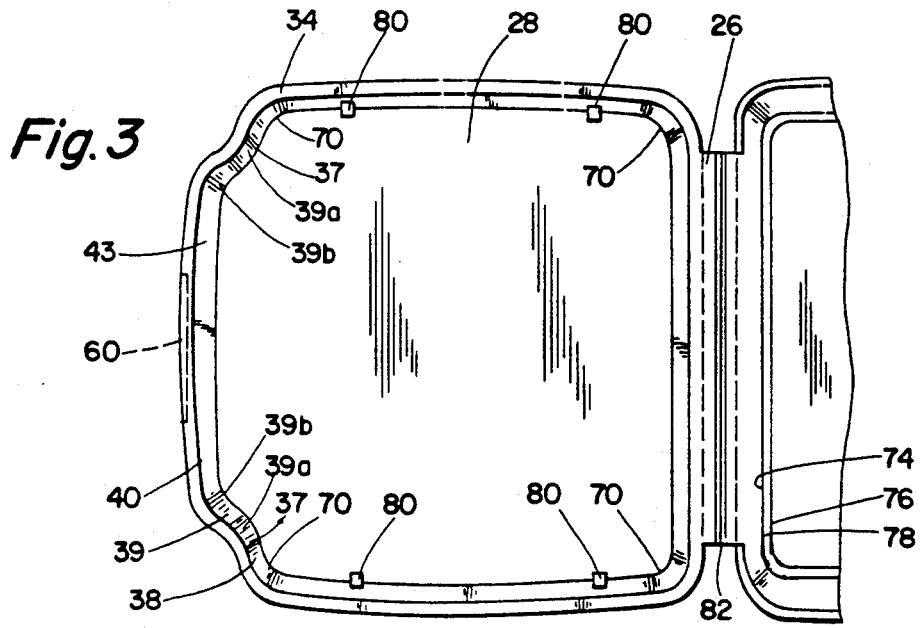
FIG. 3 is a plan view of the empty container with the lid open and partially broken away.

The invention is preferably embodied in a container which includes a one-piece molded container body 20 having an interior 22 for receiving a stack of horizontally-oriented slices of cheese 23 or other food product having forward slice edges 25. A base wall 28 provides a bottom for the container body 20. Sidewalls 30 and 32, back wall 36, and front wall 40 extend upward from the base wall and end in an outwardly-extending lip 34. The front, back and side walls 30 and 32 intersect at rounded corners 70. Along the back wall 36, the lip 34 extends to an integral hinge 26 which pivotably connects a lid 24 to the container body 20. The hinge 26 comprises a web of material which has a substantially planar upper surface when the lid is open as shown in FIGS. 2 and 3 and which has a narrow flexible region 82 of reduced cross-section to permit the lid to pivot with relatively little resistance. When the container is in a horizontal position with the lid open as shown in FIGS. 2 and 3, the gravitational force on the lid will retain it in the open position absent any external force thereon.

In accordance with a feature of the invention, a forward protrusion 40 defines an access cavity 41 to provide a convenient means of access to the forward edges 25 of the sliced food product 23 within the container.

To provide the forward protrusion 40, the front wall has portions 39 at each side adjacent the forward corners 70 of the container body 20 which are generally S-shaped as viewed in plan. Each wall portion 39 comprises a first portion 39a which curves outward from the corner 70 through an arc of about 60° and a second portion 39b which curves inward through an arc of about 60° to join a central portion 72 of the front wall. The bottom wall 28 and lid 24 are generally rectangular, except that each has a forward projection which gives its forward edge a configuration corresponding to that of the front wall 40 as described above.

The inner surfaces of the front wall at the forward corners 70 and wall portions 39a define product-contacting areas 37 which engage the forward edges 25 of the sliced food product 23. The wall portions 39 extend forward from the slice-contacting areas 37 of the front wall 38 far enough to enable a consumer to place his thumb or one or more fingers inside of the access cavity 41 defined between the protrusion 40 and the forward slice edges 25 and separate a slice from the stack of sliced food product 23. To this end, the front wall 38 is configured to provide an empty space having dimensions of at least ¼ in. by 1 in. between the interior of the front wall 38 and the forward edges 25 of the top slice of food product. The central portion 72 of the front wall is slightly curved so that its inner surface is slightly concave, with the maximum distance between the inner surface 43 of the forward protrusion 40 and the forward edges 25 of the product being at the center of the front wall. This distance, measured at the top of the container body, is at least ⅜ in. and preferably, between about ⅜ and ¾ in. In one particular preferred embodiment, the maximum distance is about ½ in. The width of the access cavity, as defined by the average distance between the inner surfaces of wall portions 39b, is at least 1 in., and preferably between 1 in. and 3½ in. In one particular preferred embodiment, the width of the access cavity is about 3 in.

To enable stacking of the containers in closed position, the sidewalls 30 and 32, back wall 36, and front wall 38 converge slightly inwardly from the lip 34 to the base 38, and a ridge 42 is disposed on the top surface 44 of the lid 24 to define a lid depression 44. The lid depression 44 is slightly larger than the base wall 28 and similarly shaped so that the base wall 28 of one container may be easily placed within the lid depression 44 of another container for stacking.

The ridge 42 preferably comprises a downwardly-opening channel having an outer wall 74, an inner wall 76 and a top wall 78 which is of substantially uniform width over its entire length. The outer wall 74 of the ridge is spaced a uniform distance from the edge of the lid about its periphery. To provide conformity between the periphery of the base wall 28 of one container and the inner wall of the channel 42 on a container stacked beneath it, each of the corners 70 and inwardly curving wall portions 39b has a radius of curvature which increases from the bottom of the container to the top, and each of the outwardly curving wall portions 39a has a radius of curvature which decreases from bottom to top.

To enable containers to be nested in open position, each container has a pair of vertical ribs 80 provided on the inner surface of each of its sidewalls to engage the bottom of a second container nested within it. Each rib 80 has a substantially horizontal upper support surface.

Figures 4, 5:
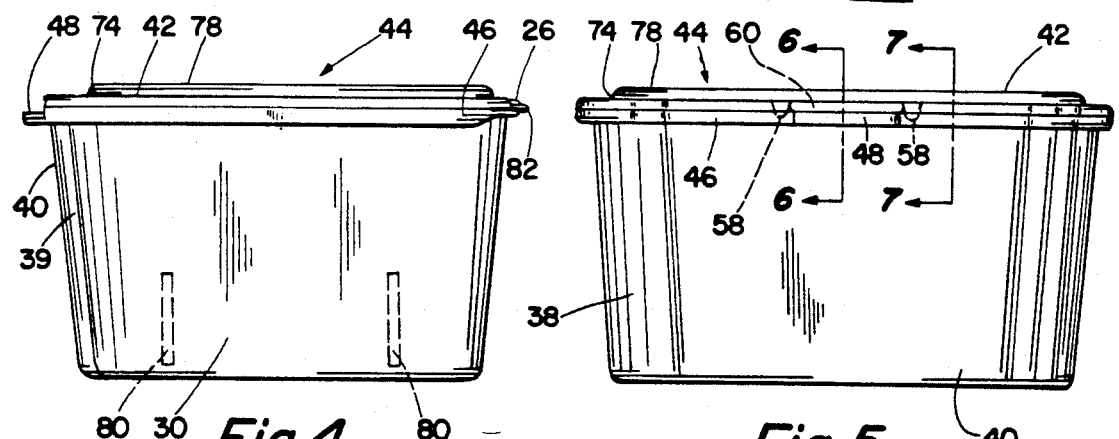
FIG. 4 is a side elevational view of the container with the lid closed.
FIG. 5 is a front elevational view of the container with the lid closed.
Figure 6:
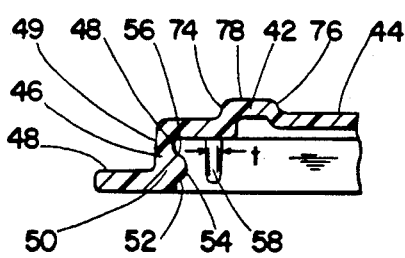
FIG. 6 is a fragmentary, cross-sectional view of the lid taken along line 6—6 of FIG. 5.
Figure 7:
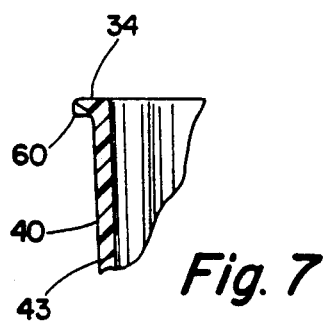
FIG. 7 is a fragmentary, cross-sectional view of the lip and projection taken along line 7—7 of FIG. 5.
Figure 8:
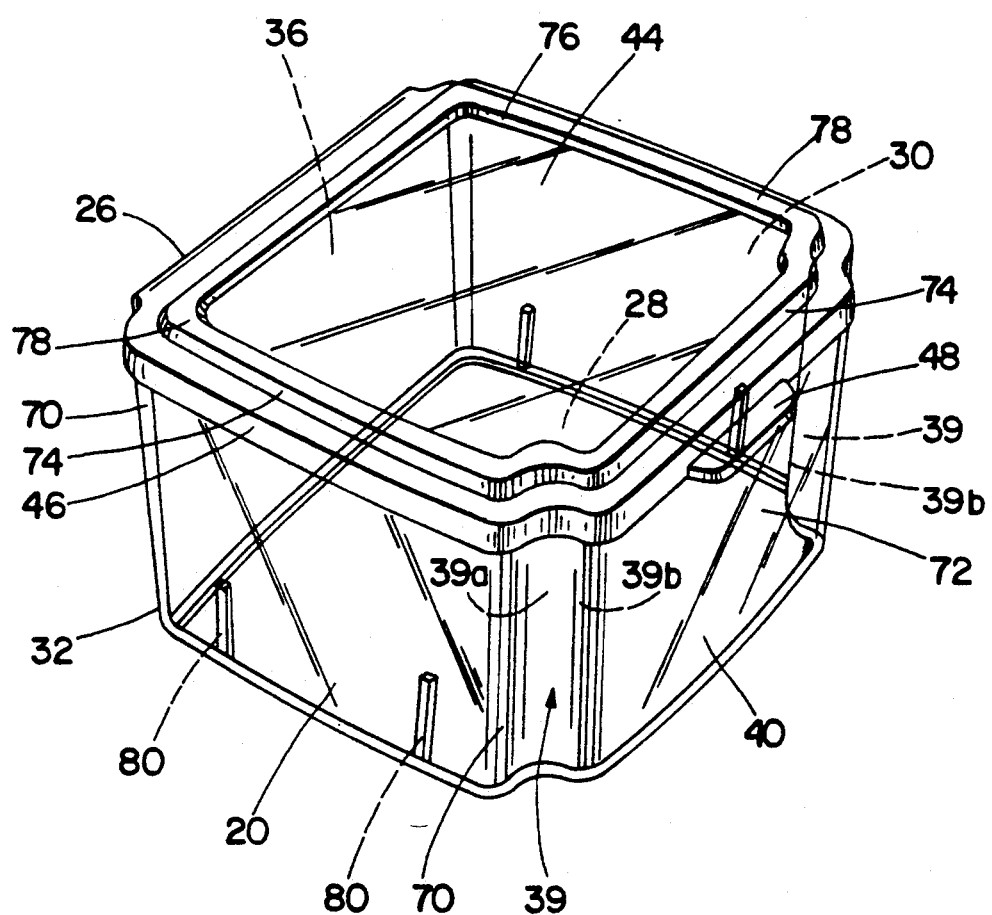
FIG. 8 is a perspective view of the container with the lid closed.

As seen in FIGS. 4 and 5, a rim 46 extends downwardly from the peripheral edge of the lid 24. The rim 46 is provided with an opening tab 48 extending horizontally outward from the outer surface 49 of the rim 46, disposed centrally of the front of the lid. As best illustrated in FIG. 6, a rib 50 is disposed on the inner surface 47 of the rim 46. The rib 50 has a lower surface 52, a peak 54, and an upper surface 56 for engaging the lip 34 and a projection 60 disposed centrally of the front wall on the underside of the lip 34. The projection 60 provides the front-central portion of the lip 34 with a generally rectangular cross-section, as shown in FIG. 7. Adjacent the ends of the rib 50 are a pair of teeth 58 which are spaced inwardly from the rim 46, and which are spaced apart from one another at a distance slightly greater than the length of projection 60 so that they engage the inner edge of the lip 34 as the lid closes, and limit inward deflection of the lip and the forward protrusion 40. Each of the teeth 58 is tapered so as to decrease in thickness and in width toward a rounded tip at its lower end. Each tooth 58 has an average width (i.e., the dimension parallel to the lip across the front of the container) of about ⅛ in. and an average thickness (shown as "t" in FIG. 6) of about 1/16 in.

To remove a slice from the container, a consumer may hold the container with the front wall facing him, and place a thumb into the open container body 20 at the access cavity 41 as shown in FIG. 2. The consumer may then insert the tip of the thumb under the forward edge 25 of the top slice 23 to lift it slightly, then grasp the slice between thumb and finger and remove it from the container body 20. Should the consumer wish to remove more than one slice, the front edges 25 of the slices are visible so that the consumer may count the number of slices 23 while his or her thumb engages the front edges 25 of the slices. To this end, the access cavity provides visibility, and the front wall of the container has a sufficient degree of transparency to permit the forward edges of the slices to be counted when viewed through the front wall. This enables the consumer to select and remove a desired number of slices with relatively little handling thereof.

To reclose the lid 24, the consumer may press downward at the tab 48. The lower surface 52 of the rib 50 deflects the projection 60 and the lip 34 inwardly while the teeth 58 engage the inner edge of the lip 34 on either side of the projection 60 to provide resistance to inward deflection thereof. The inward deflection of the projection 60 and lip 34 effect elastic strain of the lip 34, projection 60 and adjacent wall portions. The continued closure of the lid downwardly pushes the peak 54 of the rib 50 past the projection 60, and the projection 60 and lip 34 then toward their undeflected positions with a camming effect on the upper surface 56 of the rib 50 to drive the lid downward. The configuration of the rib 50 and projection 60 provide a rapid release of strain energy in the form of an audible snap action as the lid 24 reaches the fully closed position. When the lid is closed, the rib 50 may engage the projection 60 in an interference fit such that the lid is biased downwardly.

To open the lid 24, the consumer presses upward on the opening tab 48. Interference between rib 50 and projection 60 creates initial resistance until, as the peak 54 of the rib 50 passes its point of maximum deflection by the projection 60, a rapid release of strain energy again occurs, and the lid will then "pop" open.

In the preferred embodiment, the container is molded of polypropylene and has an average wall thickness between about 0.25 in. and about 0.75 in. This material provides a sufficient degree of transparency while also providing strength and durability such that the container is dishwasher safe and is resistant to cracking, distortion, or other failures through repeated usage over a period of time.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A reclosable container in combination with a plurality of sliced food products stacked within said container comprising:
   a container body comprising a base wall; a pair of opposite side walls, a front wall, and a rear wall extending upward from the base wall; and a lip extending outwardly about the upper periphery of said container body along said front, rear and side walls;
   a lid; and
   a hinge supporting said lid on said container body for pivotal movement between an open position and a closed position, said hinge being connected to said lip along said rear wall;
   said food products being oriented horizontally and having forward edges disposed adjacent said front wall;
   said front wall having a protrusion defining an access space between said forward edges of said food products and said protrusion so as to maintain a distance of at least about ¼ in. between said food products and said protrusion, said protrusion having a width of at least about 1 in.

2. A combination in accordance with claim 1 further comprising locking means for locking said lid in closed position and providing an audible snap upon locking and unlocking of said lid.

3. A combination in accordance with claim 2 wherein said locking means comprises a depending rim on said lid having a rib disposed inwardly thereof, and a projection on said lip of said container body for engaging said rib, said lid further comprising means for limiting inward deflection of said lip when said lip is in said closed position.

4. A combination in accordance with claim 1 wherein said container has an average wall thickness of at least 0.025 in.

5. A combination in accordance with claim 1 wherein said lid has a continuous downwardly opening channel thereon defining a ridge having a shape corresponding to that of said base wall to facilitate stable stacking of said container with other like containers, said lid having a periphery uniformly spaced from said channel, said channel having substantially uniform width.

6. A combination in accordance with claim 5 wherein said front, rear and side walls of said container body converge slightly from top to bottom, and wherein said container body has rounded front and rear corners, each having a radius of curvature which decreases from top to bottom, said front wall having on each side, proceeding inward from said front corners, an outwardly-curved portion, and an inwardly-curved portion, each said outwardly-curved portion having a radius of curvature which increases from top to bottom, each said inwardly-curved portion having a radius of curvature which decreases from top to bottom.

7. A method of removing at least one slice of stacked, sliced food product from a reclosable container comprising:
   providing a container body having a base wall, a front wall, a rear wall opposite said front wall, and a pair of side walls and a plurality of slices of a food product stacked within said container body;
   providing a reclosable lid attached to said rear wall;
   providing an access cavity formed by forward edges of said sliced food product, a base wall, and a forward protrusion of said front wall of said container body, said access cavity being of sufficient dimensions that a thumb may be inserted into said access cavity;
   opening said lid of said container;
   placing a thumb on a front edge of at least one slice of said food product;
   separating said at least one slice of said sliced food product from other slices;
   grasping said at least one slice of said sliced food product between the thumb and finger;
   removing said at least one slice of said plurality of sliced food product from said container.

8. A method of claim 6 wherein a predetermined number of slices of a stacked, sliced food product are removed from a reclosable container comprising the additional step of, after opening said lid, counting a predetermined number of slices of food product down from the top of said plurality of slices.

* * * * *